OR 3,054,858

SEARCH ROOM

SUBSTITUTE FOR MISSING OR

X 325/53

X 325/308

Sept. 18, 1962 J. D. REID 3,054,858

SIGNAL DISTRIBUTION ARRANGEMENT FOR CLOSED-CIRCUIT COMMUNICATIONS SYSTEMS

Filed May 12, 1959 4 Sheets-Sheet 1

INVENTOR.
JOHN D. REID
BY
Darby + Darby
ATTORNEYS

INVENTOR.
JOHN D. REID
BY Darby + Darby
ATTORNEYS

INVENTOR.
JOHN D. REID
BY Darby & Darby
ATTORNEYS

INVENTOR.
JOHN D. REID
BY Darby & Darby
ATTORNEYS

United States Patent Office 3,054,858
Patented Sept. 18, 1962

3,054,858

SIGNAL DISTRIBUTION ARRANGEMENT FOR CLOSED-CIRCUIT COMMUNICATIONS SYSTEMS

John Drysdale Reid, Little Rock, Ark., assignor to AR & T Electronics, Inc., Little Rock, Ark., a corporation of Arkansas Filed May 12, 1959, Ser. No. 812,649
6 Claims. (Cl. 179—2)

This invention relates to an improved closed-circuit distribution system for communications signals and the like.

In my copending application, Serial No. 712,229, filed January 30, 1958, now Patent Number 2,996,580, there is disclosed a closed-circuit distribution system for radio or television communications signals and the like wherein program signals are distributed to a plurality of remotely located subscriber locations over transmission lines. In such a system, a separate transmission line is employed for each program to be distributed, so that if N programs are to be transmitted, there would be N transmission lines connecting each of the subscriber locations with the master or central station at which the programs originate. The system disclosed in the above-mentioned application also provides means for conducting an audience survey which contemplates the transmission of audience survey signals over the same transmission lines which carry the communications or program signals to the subscribers' receivers. Although the audience survey signals may take the form of A.C. signals having a frequency sufficiently different from the communications signals to permit easy discrimination between the two, the survey signals usually take the form of D.C. signals. At each of the subscriber locations, means are provided for altering a characteristic of the aduience survey signals by a predetermined amount, so that the total variation in the audience survey signals at the central station may be determined to thereby obtain certain information, such as the number of subscribers receiving a particular program or the response of the audience to questions transmitted from the central station.

Inasmuch as the audience survey signals are transmitted over the same transmission lines as the communication signals, a difficulty is encountered when the closed-circuit distribution system is designed to cover a wide geographic area, such as a large city, for example. In such a case, the transmission lines must, of necessity, extend over long distances and therefore means must be provided to insure that each subscriber receives a signal of usable level. This, of course, suggests the use of signal "boosters," such as repeater amplifiers and the like, which must be capable of not only transmitting the communications signals but also passing the audience survey signals. Furthermore, since a number of different programs may be transmitted over the different transmission lines, it is essential that the coupling between the various transmission lines be kept to a minimum, so that cross-talk and other interference will not mar the reception of the programs by the system subscribers.

Accordingly, it is an object of this invention to provide a closed-circuit distribution system for communications signals and the like wherein means are provided to insure that the system subscribers receive signals at usable levels.

It is a further object of this invention to provide a closed-circuit distribution system for communications signals and the like wherein cross-talk and other forms of interference are minimized.

It is a still further object of this invention to provide a closed-circuit distribution system for communications signals and the like wherein repeater amplifiers are employed to amplify the communications signals and wherein means are provided for passing audience survey signals.

It is an additional object of this invention to provide an isolation network for coupling a group of receivers to a transmission line in a closed-circuit distribution system for communications signals and the like, which isolation network effectively minimizes coupling between the receivers in the group and between the receivers and the line.

Briefly, the invention contemplates a closed-circuit distribution system having one or more primary transmission lines feeding a plurality of secondary transmission lines. Repeater amplifiers are coupled in the primary transmission line to amplify the communications signals in that line and bypass means are arranged to shunt each of the repeater amplifiers to pass only the audience survey signals. When the audience survey signals are D.C. signals, the bypass means may take the form of a coil connected to shunt the amplifier. An A.C. bridging amplifier is provided to couple the primary transmission line to two secondary transmission lines. The bridging amplifier has a high input impedance and a low output impedance to effectively isolate the secondary transmission lines. Additionally, bypass means are provided for the bridging amplifier to pass the audience survey signals, so that both communications signals and audience survey signals are introduced into the secondary transmission lines. Finally, an isolating network serves to couple a group of subscribers' receivers to the secondary transmission lines, so that each receiver of the group receives both communications signals and audience survey signals. By utilizing separate ground connections in the network for each receiver of the group, the common coupling impedance is reduced, so that the receivers to the group are effectively isolated from the transmission line and from each other. When the audience survey feature of the closed-circuit distribution system is eliminated, it is possible to utilize the transmission lines for carrying the D.C. supply for the amplifying devices of each repeater and/or bridging amplifier. In this event, a coil is connected between one of the line terminals of the amplifier and the D.C. supply terminal of the amplifier, so that the amplifying devices receive their D.C. supply directly from the transmission line.

Figure 1:
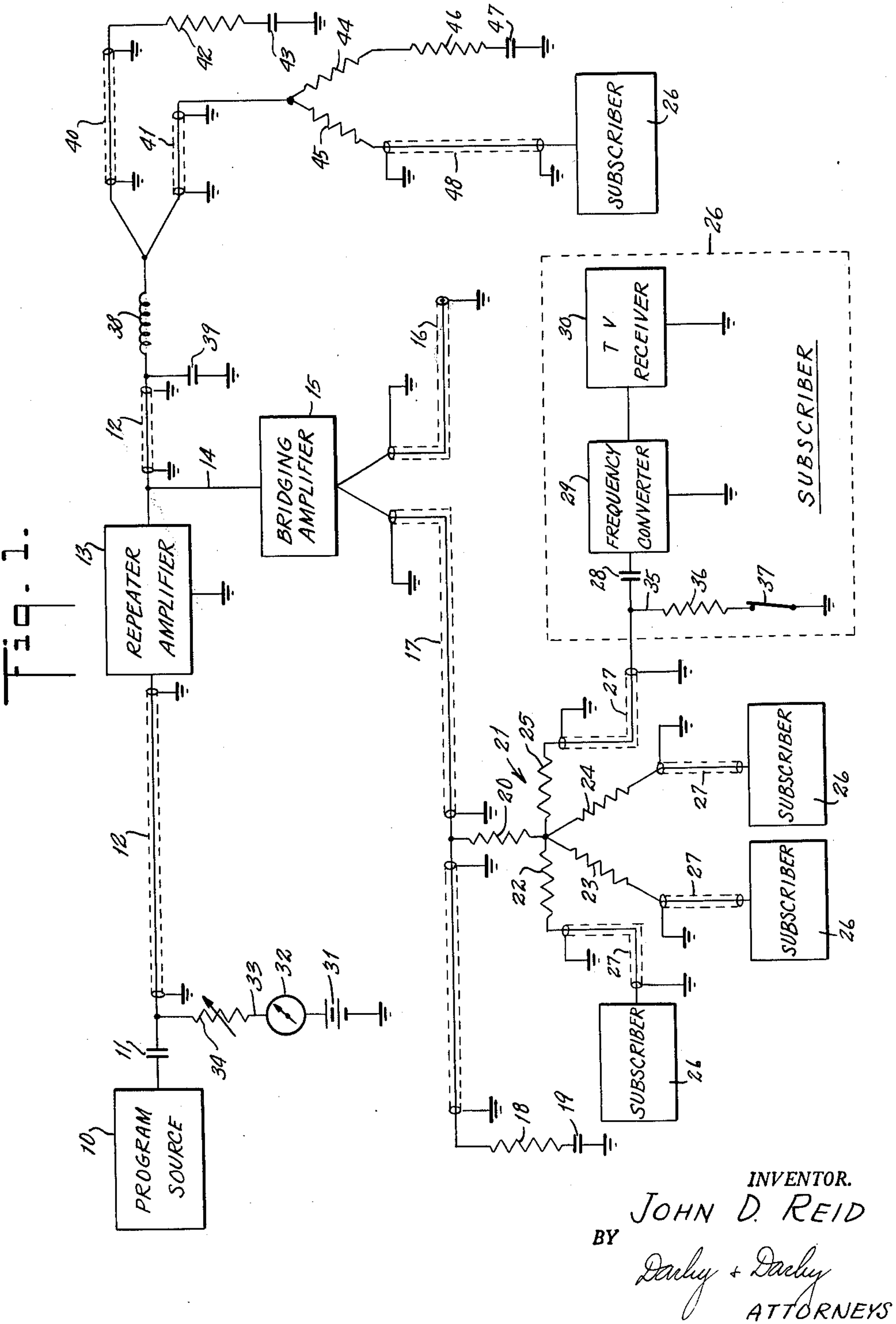
FIG. 1 is a schematic circuit diagram of a closed-circuit distribution system for television signals which incorporates the teachings of the present invention.

Referring now to FIG. 1 of the drawings, there is shown a closed-circuit distribution system for television signals of the type disclosed in my aforementioned patent application, wherein means are provided for the distribution of audience survey signals over the same transmission lines carrying the communications or program signals. As seen in FIG. 1, the communications signals originate at a source 10 of program signals which may be a local television studio or a master receiving antenna if the system is used as a community antenna system. As explained in my aforementioned patent application, the home television receivers of the system subscribers may be utilized to receive the transmitted program signals by tuning the receivers to an unused channel, that is, a channel that is not utilized for commercial television broadcasting. While it is possible to transmit the television signals at the center frequency of the unused channel to which the subscribers' receivers are tuned, it is usually not desirable to do so because of the excessive losses in the transmission lines in the broadcast frequency range. Therefore, the television signals are usually transmitted at lower center or "carrier" frequencies than the range of broadcast frequencies. Accordingly, the program source 10 may include means for converting the carrier frequency of the original television signals to a lower carrier frequency for distribution in the system. Using the example set forth in my aforementioned patent application, if the subscribers' receivers are left fixed-tuned to channel 6 (82–88 mc.), the television signals transmitted from program source 10 may be in a band from 7 to 13 mc. with a center frequency of 10 mc.

The television signals from source 10 are coupled by a capacitor 11 to a primary transmission line 12 which may be a coaxial cable as illustrated. Since losses occur in primary transmission line 12, provision is made to include a repeater amplifier 13 at suitable intervals along the line. For example, if the primary transmission line has a loss factor of 1 db per 100′ of line, a repeater amplifier having a gain of about 14 db would be spaced every 1400′ along the primary transmission line. The primary transmission line 12 is coupled at needed intervals by a lead 14 to the input of a bridging amplifier 15. The output of the bridging amplifier is coupled to secondary transmission lines 16 and 17. The bridging amplifier 15 may have a lower gain and a higher power output as compared to the repeater amplifier 13, since its primary functions are isolation and the connection of the primary transmission line to two secondary transmission lines. If the primary transmission line 12 is a 72 ohm coaxial cable, line 14 could be a 300 ohm cable, to present a high input impedance and isolate the secondary transmission lines. Furthermore, if the secondary transmission lines 16 and 17 are 70 ohm cables, the output impedance of the bridging amplifier 15 should be 140 ohms. Therefore, the bridging amplifier should have an input impedance of 300 ohms and an output impedance of 140 ohms. With the line parameters described, a suitable signal gain for the bridging amplifier could be about 12 db.

The secondary transmission line 17 is coupled to ground through a terminating impedance comprising resistor 18 and capacitor 19. The terminating impedance may be the characteristic impedance of the transmission line which prevents unwanted reflections and distortion from occurring. The secondary transmission line 17 is also coupled to an isolation network or "four-way tap-off" 21. The network 21 comprises an isolating resistor 20 and distribution resistors 22, 23, 24 and 25 which are connected by coaxial lines 27 to the respective subscriber locations 26. By this means, isolation network 21 introduces the program signals into four subscriber locations from the secondary transmission line 17. Basically, the function of the network 21 is to isolate the subscriber locations from the secondary transmission lines and from each other. In this regard, it may be noted that separate ground connections for each of the lines 27 should be provided to reduce the common coupling impedance between the lines and hence reduce unwanted coupling and cross-talk to a minimum. At each of the subscriber locations 26, the program signals are introduced by the coaxial line 27 to a frequency converter 29 through a coupling capacitor 28. The function of the frequency converter, as explained in my aforementioned patent application, is to convert the carrier frequency of the transmitted program signals to the center frequency of the channel to which the television receiver of the subscriber is tuned. For example, if the receiver 30 is tuned to channel 6 (82–88 mc.) and the television signals are transmitted in a band from 7 to 13 mc., the frequency converter 29 would produce a local oscillator signal having a frequency of 95 mc. which is heterodyned with the received signals to produce the required output signals in the band from 82 to 88 mc.

The audience survey signals are introduced into the primary transmission line 12 at the central station from a D.C. source, such as the battery 31 illustrated. The battery is connected between ground and line 12 through a recording ammeter 32, a lead 33 and a variable "adjusting" resistor 34. Since capacitor 11 serves to isolate the D.C. survey signals from the program source 10, the survey signals are transmitted over primary transmission line 12 to the repeater amplifier 13, wherein suitable means are provided, as will be described hereinafter, to bypass the survey signals. At the output of repeater amplifier 13, the survey signals are transmitted by line 14 and are bypassed around bridging amplifier 15 to the secondary transmission lines 16 and 17. The audience survey signals are then transmitted through isolating resistor 20, and the distribution resistor 25 of the network 21, to the equipment located at the subscriber location 26. Since capacitor 28 prevents the D.C. survey signals from entering the frequency converter 29, the survey signals pass through a lead 35, an audience survey resistor 36 and a switch 37 to ground, where they are returned to the central station. As explained in my aforementioned copending patent application, the switch 37 may be opened and closed in response to certain conditions existing at the subscriber location, to thereby place audience survey resistor 36 in or out of circuit with the central station source 31. By utilizing a survey resistor 36 of predetermined value, the D.C. current transmitted from the central station may be made to vary in magnitude in accordance with the number of subscriber locations at which the condition exists. For example, if it is desired to determine the number of subscribers receiving a particular program, the switch 37 may be closed when the television receiver 30 is energized, so that the total variation in audience survey curent at the central station represents the total number of subscribers receiving that program. Similarly, by arranging to open or close the switch 37 in response to transmitted questions, the reaction of the audience to the questions may be ascertained at the central station, to thereby conduct a poll of audience opinion.

While the distribution system, as thus far described, makes provision for the coupling of a primary transmission line to a plurality of secondary transmission lines, the termination of the primary transmission line will now be described, assuming that there is but a single subscriber location 26 at the end of the line. The end of primary transmission line 12 is coupled to a two-way inductive "splitter" comprising coil 38 and capacitor 39. The function of the splitter is to connect the primary line 12 to secondary transmission lines 40 and 41. It may be noted that the capacitor 39 serves to prevent the grounding of the D.C. audience survey signals as does the capacitor 19 at the end of secondary transmission line 17. Secondary transmission line 40 is coupled to ground through a terminating impedance comprising resistor 42 and capacitor 43. Again, capacitor 43 prevents the grounding of the audience survey signals. The secondary transmission line 41 is coupled to a two-way resistive splitter comprising resistors 44 and 45 which function to couple the secondary line 41 to a subscriber line 48 connected to the subscriber location 26. In the arrangement illustrated, the resistor 44 is coupled to ground through a terminating impedance comprising resistor 46 and capacitor 47, since there is but a single subscriber location 26 at the end of the line to be coupled to the system. Again, the capacitor 47 prevents the audience survey signals from being grounded.

From the foregoing description, it will be seen that both the communications signals and the audience survey signals are transmitted to each of the subscriber locations 26 with provisions being made to insure that a signal of usable level is received by each subscriber. Since the function of the two-way inductive splitter is to connect the primary transmission line to two secondary transmission lines, it will be understood that this type of splitter could be used in place of the bridging amplifier 15 wherever a signal gain is not necessary, as at the ends of the transmission lines for example. Furthermore, it will be understood that where a plurality of different programs are to be transmitted to each of the subscriber locations 26, a separate set of transmission lines would be utilized for each program, so that if N programs are to be transmitted, there would be N transmission lines. In such a case, as explained in my aforementioned patent application, a line selector switch would be provided at the input of the frequency converter 29 at each of the subscriber locations to permit the subscriber to connect the converter to a particular transmission line and to thereby select the particular program which he wished to receive.

Figure 2:
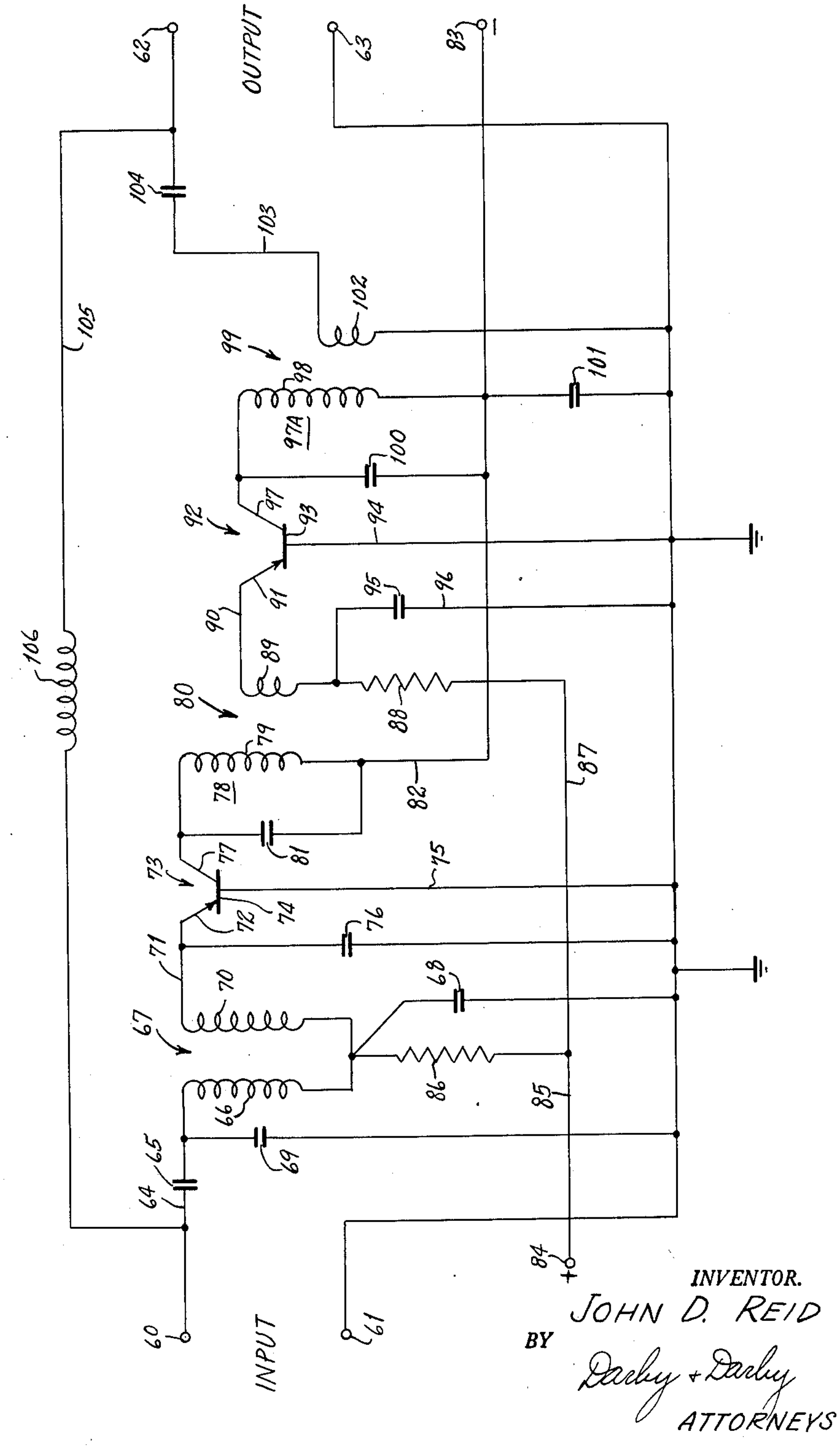
FIG. 2 is a circuit diagram of a repeater amplifier suitable for use in the system of FIG. 1.

The circuit diagram of a transistorized A.C. amplifier suitable for use as the line repeater amplifier 13 in the system of FIG. 1 is shown in FIG. 2 of the drawings. As seen in FIG. 2, the amplifier comprises input terminals 60 and 61 and output terminals 62 and 63 which may be connected to the 72 ohm primary transmission line 12. Input terminal 61 and output terminal 63 are coupled directly together and to ground, as illustrated, while input terminal 60 is coupled by a lead 64 and a coupling capacitor 65 to the primary winding 66 of an input transformer 67 and thence to ground through a bypass capacitor 68. A capacitor 69 is shunted across primary winding 66 and capacitor 68 to form a parallel-tuned circuit which is tuned to the band of television signals being transmitted. The secondary winding 70 of the input transformer 67 is coupled at one end to ground through capacitor 68 and at the other end to the emitter 72 of a transistor 73 by a lead 71. A capacitor 76 is connected between ground and the emitter 72 and forms a parallel-tuned circuit with secondary winding 70 and capacitor 68. The base 74 of the transistor is connected directly to ground by a lead 75. The collector 77 of the transistor is connected to a parallel-tuned circuit 78 comprising primary winding 79 of an inter-stage transformer 80 and a capacitor 81 and thence to ground through a lead 82 and a bypass capacitor 101. The collector is also connected by the lead 82 to a supply terminal 83 of a source (not shown) of D.C. bias supply for the collector 77. The bias for the emitter 72 of the transistor 73 is obtained from a supply terminal 84 of the bias supply source by connecting the terminal 84 to the junction of primary winding 66 and secondary winding 70 of the transformer 67 by means of a lead 85 and a resistor 86. The path for the emitter bias is through lead 85, resistor 86, secondary winding 70 and lead 71 to the emitter 72. A secondary winding 89 of the interstage transformer 80 is coupled at one end to ground through bypass capacitor 95 and lead 96 and at the other end to the emitter 91 of a second stage transistor 92 by a lead 90. The base 93 of the second stage transistor is connected directly to ground through a lead 94. The bias for the emitter 91 is obtained by connecting the junction of secondary winding 89 and capacitor 95 to the supply terminal 84 of the bias supply by a resistor 88 and leads 87 and 85. The collector 97 of the transistor 92 is connected to ground through a parallel-tuned circuit 97A and the bypass capacitor 101 and to the supply terminal 83 of the D.C. bias supply source by lead 82. Tuned circuit 97A comprises primary winding 98 of an output transformer 99 and a capacitor 100 and is tuned to the band of television frequencies being transmitted. The secondary winding 102 of the output transformer 99 is connected between ground and the output terminal 62 of the amplifier by means of a lead 103 and a coupling capacitor 104.

As thus far described, it is believed apparent that the transistors 73 and 92, each of which is connected in the familiar "common base" configuration, constitute an effective A.C. amplifier for the television signals being transmitted. However, bypass means are provided for the audience survey signals by connecting a coil 106 between line input terminal 60 and line output terminal 62 by means of a lead 105. The coil 106 is designed to present a high impedance to the band of television signals being transmitted, so that the television signals pass through coupling capacitor 65 to the two-stage transistor amplifier. However, the capacitor 65 prevents the D.C. audience survey signals from entering the amplifier and thereby shunts them through the coil 106 to the output terminal 62. Since the coil 106 presents a negligible resistance to the D.C. survey signals, the value of the audience survey readings at the central station will not be materially changed. Accordingly, the repeater amplifier shown in FIG. 2 provides means for amplifying the communications signals and for bypassing the audience survey signals. It will be understood, however, that when the audience survey signals are A.C. signals of a different frequency than the band of communications signals, the coil 106 may be replaced by a tuned circuit which passes only the audience survey signals.

Figure 3:
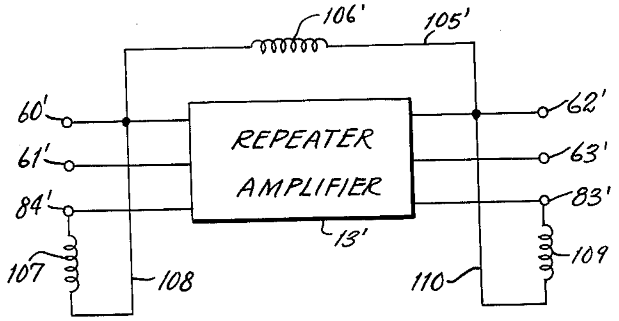
FIG. 3 is a schematic circuit diagram of a modified form of the repeater amplifier of FIG. 2.

When the closed-circuit distribution system does not include means for conducting an audience survey, a modified repeater amplifier 13′, as shown in FIG. 3 of the drawings, may be utilized. In this arrangement, the D.C. supply for the transistor elements of the amplifier is transmitted over the transmission line with the television signals in place of the D.C. survey signals. The coil 106′ is again connected directly between the input line terminal 60′ and the output line terminal 62′ by means of a lead 105′, so that the amplifier 13′ is bypassed by the D.C. supply signals. However, a coil 107 is connected by a lead 108 between input line terminal 60′ and D.C. supply terminal 84′ which is connected to the emitter electrodes of the transistors. The coil 107 passes the D.C. supply current for the transistors but presents a high impedance to the band of communications signals transmitted. Similarly, a coil 109 is connected by a lead 110 between output line terminal 62′ and the D.C. supply terminal 83′ which is connected to the collector electrodes of the transistors. Again, the coil 109 passes the D.C. supply current for the collector electrodes of the transistors but effectively rejects the band of television signals being transmitted. By utilizing the bypass coil 106′, the D.C. supply current for the transistors of a plurality of repeater amplifiers may be transmitted over the transmission line connecting those amplifiers, to thereby reduce the number of lines needed for the system and facilitate compact packaging of the components thereof.

Figure 4:
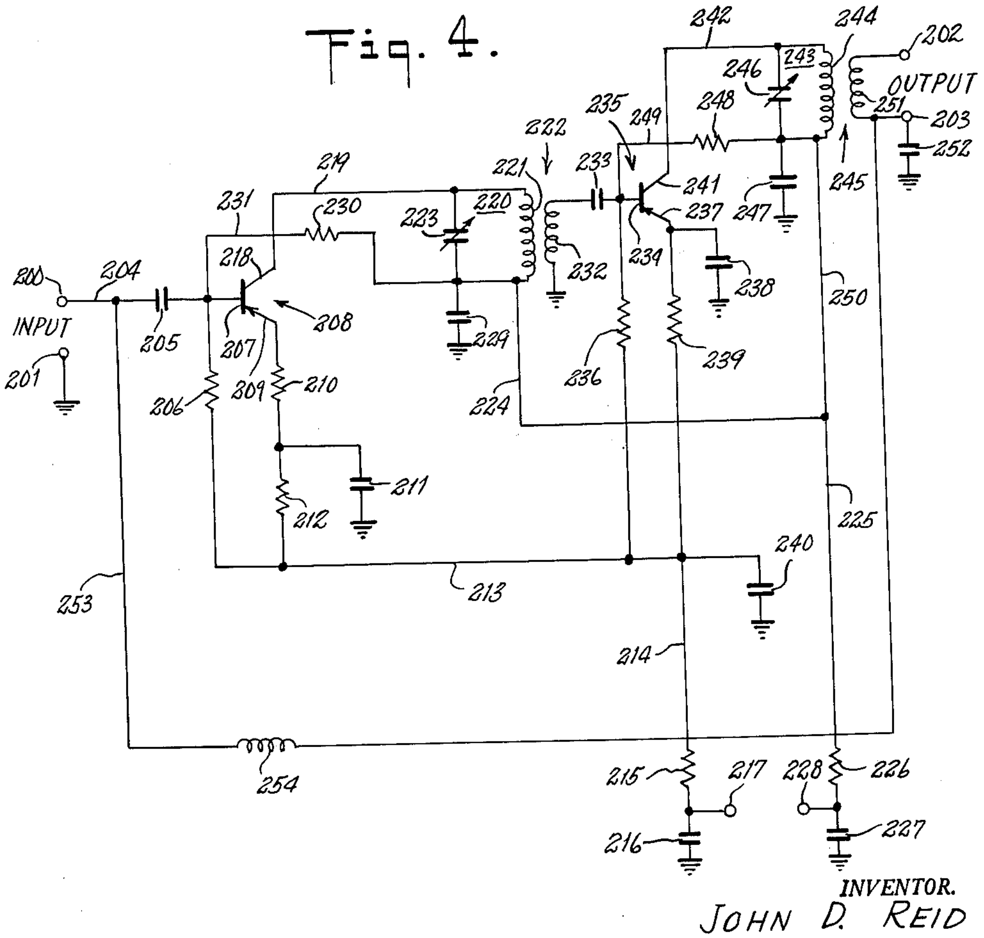
FIG. 4 is a circuit diagram of a bridging amplifier suitable for use in the system of FIG. 1.

FIG. 4 of the drawings illustrates the circuit diagram of a transistorized amplifier suitable for use as the bridging amplifier 15 in the system of FIG. 1. As seen in FIG. 4, the bridging amplifier has input terminals 200 and 201 and output terminals 202 and 203. Input terminal 200 is coupled by a lead 204 and a coupling capacitor 205 to the base 207 of a PNP junction transistor 208. The transistor 208 is connected in the familiar "common emitter" circuit configuration and therefore has its emitter 209 connected to ground through emitter resistances 210 and 212, lead 213 and capacitor 240. The usual bypass capacitor 211 is provided to bypass emitter resistance 212. The collector 218 of the transistor is connected by a lead 219 to a parallel-tuned circuit 220 comprising primary winding 221 of transformer 222 and capacitor 223 and thence to ground through a capacitor 229. The bias supply for the transistor is obtained from a source (not shown) having terminals 217 and 218. Terminal 217 is connected through a "hum filter" comprising resistor 215 and capacitor 216 and through leads 224 and 213 to the lower end of emitter resistance 212. The lower end of resistor 212 is also connected to the base 207 of the transistor by a bias resistor 206. Terminal 208 of the bias supply source is connected through a hum filter comprising resistor 226 and capacitor 227 and through leads 225 and 224 to one end of a base bias resistor 230. The other end of the resistor 230 is connected to the base 207 through a lead lead 231. Resistors 206 and 230 combine to form a voltage divider which applies the proper base bias current to the base element 207 of the transistor. The bypassed emitter resistance 212 serves in the usual manner to increase the input impedance of the transistor, so that the bridging amplifier presents a high input impedance to accommodate the 300 ohm line 14 of FIG. 1. The secondary winding 232 of the interstage transformer 222 is coupled at one end to ground and at the other end to the base electrode 234 of a second-stage transistor 235 by means of a coupling capacitor 233. As illustrated, the second-stage transistor 235 may also comprise a PNP junction transistor connected in a common emitter circuit configuration. Accordingly, the emitter 237 of the transistor is connected to ground through emitter resistor 239 and bypass capacitor 240. The emitter resistor 239 is again bypassed by a capacitor 238. A base bias resistor 236 is connected between the base 234 and the lower end of emitter resistor 239. The collector 241 of transistor 235 is coupled by lead 242 to a parallel-tuned circuit 243 comprising primary winding 244 of output transformer 245 and a capacitor 246 and thence to ground through capacitor 247. A base bias resistor 248 is connected at one end to the base 234 by lead 249 and at the other end to the D.C. supply terminal 228 by leads 250 and 225. The biasing arrangement for the second-stage transistor 235 is similar to that employed for the first-stage transistor 208. Again, resistors 248 and 236 combine to form a voltage divider across the bias supply source terminals 217 and 228, so that the base electrode 234 of the transistor 235 is properly biased. The secondary winding 251 of output transformer 245 is directly connected between the amplifier output terminals 202 and 203. The output terminal 203 of the amplifier is connected to ground through a capacitor 252 to prevent grounding of the D.C. audience survey signals. A coil 254 is connected between input terminal 200 and output terminal 203 by means of a lead 253 and serves as the inductive bypass means for the D.C. audience survey signals. Since the capacitor 205 in the input to the amplifier and the output transformer 245 prevent the D.C. survey signals from entering the amplifier, the survey signals are effectively shunted through the coil 254, while the A.C. television signals are amplified in the amplifier. It may be noted that the bridging amplifier of FIG. 4 is capable of being modified in the same manner as the repeater amplifier shown in FIG. 3 of the drawings, so that if the D.C. survey signals in the transmission line are replaced by the D.C. bias, the amplifier need not utilize a separate line for the D.C. bias supply.

Figure 5:
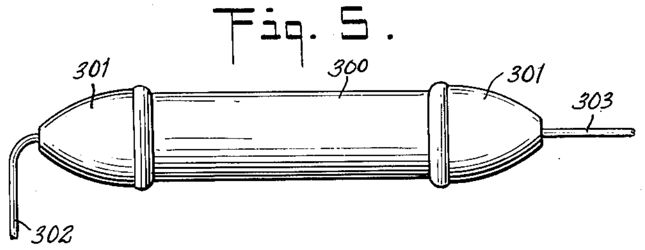
FIG. 5 is a side elevational view of a suitable enclosure for the amplifiers of the system of FIG. 1.
Figure 7:
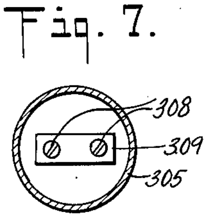
FIG. 7 is a sectional view taken along the lines 7—7 of FIG. 6.
Figure 6:
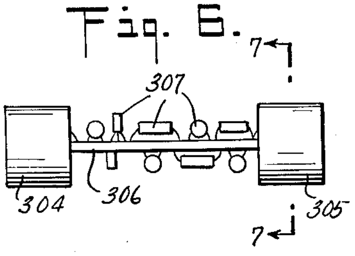
FIG. 6 is a side view of the amplifier enclosure of FIG. 5 with the tubular housing and end caps removed.

FIGS. 5–7 of the drawing show a suitable enclosure for the repeater and/or bridging amplifiers. As seen in FIG. 5, a tubular housing 300 is provided with a pair of protective rubber end caps 301. The portion of the transmission line entering the amplifier is designated as 302, while the portion of the line leaving the amplifier is designated as 303. The interior of the amplifier housing is shown in FIG. 6 of the drawings as comprising a pair of annular end members 304 and 305 which are seated inside of the tubular housing 300. A flat support member 306 of non-conducting material is secured to the inner ends of the members 304 and 305 by any convenient means, so that when the members 304 and 305 are inserted inside of the tubular housing 300, the support member 306 is rigidly held in place. The components of the amplifier, designated generally as 307, are mounted on both the upper and lower sides of the support member 306. Finally, input and output terminals 308 are mounted on a terminal board 309 in end members 304 and 305, as seen in FIG. 7 of the drawings. By utilizing an enclosure of this type, it is possible to mount the components of the repeater and/or bridging amplifiers in an extremely small space to thereby facilitate installation of the system. Since separate repeater amplifiers and bridging amplifiers are required for each transmission line in a plural line system for the transmission of plural programs, it may be desired to mount a number of the amplifiers together in a suitable holding bracket or the like.

Figure 8:
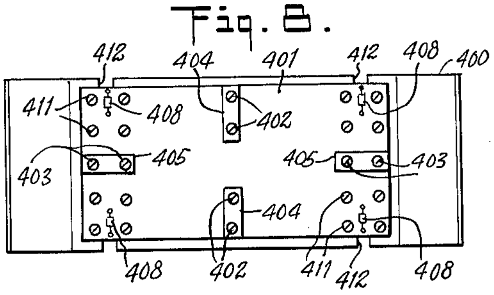
FIG. 8 is a plan view of an isolation network suitable for use in the system of FIG. 1.
Figure 10:
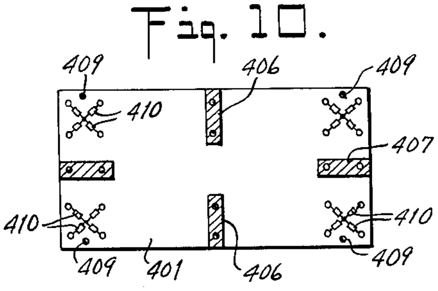
FIG. 10 is a sectional view taken along the lines 10—10 of FIG. 9.
Figure 9:
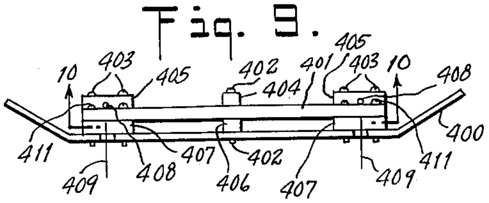
FIG. 9 is a side view of the isolation network of FIG. 8.
Figure 11:
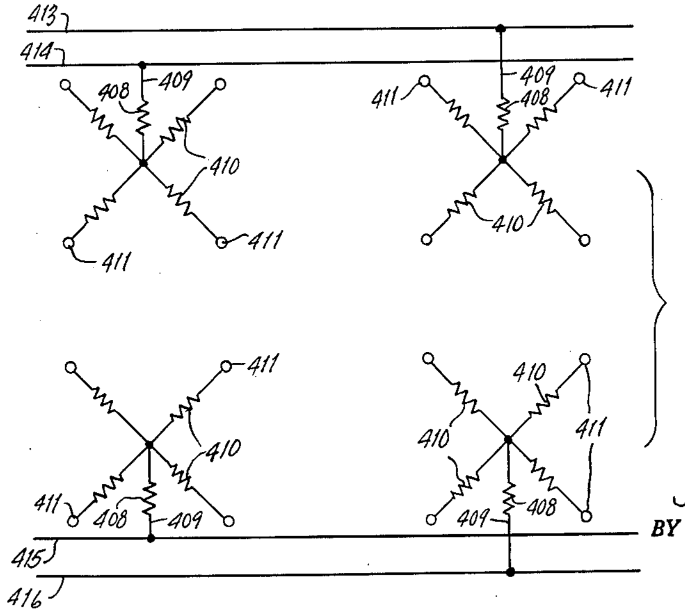
FIG. 11 is a circuit diagram of the isolation network of FIGS. 8–10.

A desirable physical arrangement of the component parts of the isolation network 21 of FIG. 1 of the drawings is shown in FIGS. 8–10 of the drawings. As seen in FIG. 8, the network may be mounted on a base member 400 which has angularly-formed portions at both ends thereof. A support member 401 of electrically non-conductive material is secured to the base 400 by terminal screws 402 and 403. The terminal screws 402 pass through a first pair of terminal blocks 404 located on the upper side of support member 401 and through a second pair of terminal blocks 406 located on the lower side of member 401. Similarly, terminal screws 403 pass through a first set of terminal blocks 405 located on the upper side of support member 401 and through a second set of blocks 407, located on the lower side of support member 401. By this means, the support member 401 is spaced from the base member 400 by the pairs of blocks 406 and 407. Since the terminal screws 402 and 403 pass through the support blocks to the base member 400, they may also function as ground terminals for the lines connected to the network. Inasmuch as the isolation network illustrated is intended to accommodate four separate transmission lines, four isolating resistors 408 are mounted on the upper side of support member 401. Leads 409 are connected to one end of each of the isolating resistors 408 and pass through openings formed in support member 401 and through slots 412 formed in the base member 400 to the outside of the base member where they are connected to their respective transmission lines. The other end of each of the isolating resistors 408 passes through an opening formed in support member 401 to the underside of the support member, as seen in FIG. 10, where it is connected to four distribution resistors 410. Each of the resistors 410 serves to connect a particular isolating resistor to a terminal 411 located on the upper side of support member 401. By this means, each transmission line is connected by one of the leads 409 to a separate isolating resistor 408 and through the distribution resistors 410 to a set of four terminals 411 located on the upper side of member 401. When the isolation network is wired into a closed-circuit distribution system, the coaxial transmission lines are grounded to the base member 400 by any convenient means (not shown) so that the base member 400 acts as the ground or reference point for the network. Since each group of four terminals 411 is connected to a particular transmission line, the lines leading to each subscriber location may be connected to one of the terminals in each group, so that the subscriber receives the four transmitted program signals. The circuit diagram for the isolation network is shown in FIG. 11 of the drawings where the four transmission lines are designated as 413, 414, 415 and 416. Since each group of four terminals 411 is bounded by one terminal block 404 having two screw terminals 402 and by another terminal block 405 having two screw terminals 403, it is seen that a separate ground connection is provided for each of the cables leading to the subscriber locations. By virtue of this arrangement, the common ground coupling impedance of the lines is reduced and cross-talk and interference minimized.

It is believed apparent from the foregoing description that many changes could be made in the described construction and many seemingly different embodiments of the invention could be made without departing from the scope thereof. Accordingly, it is intended that all matter contained in the above description or shown in the accompanying drawings shall be interpreted as illustrative and not in a limiting sense.

What is claimed is:

1. In a closed-circuit distribution system for radio or television communications signals and the like wherein both communications signals and audience survey signals are transmitted over the same primary and secondary transmission lines to a plurality of receivers, the combination comprising at least one alternating current repeater amplifier coupled in said primary transmission line for amplifying the communications signals therein; at least one alternating current bridging amplifier coupled between said primary transmission line and a pair of said secondary transmission lines for amplifying said communications signals and isolating said secondary transmission lines; and bypass means shunting each of said amplifiers for passing the audience survey signals.

2. In a closed-circuit distribution system for radio or television communications signals and the like wherein both communications signals and direct current audience survey signals are transmitted over the same primary and secondary transmission lines to a plurality of receivers, the combination comprising at least one alternating current repeater amplifier coupled in said primary transmission line for amplifying the communications signals therein; at least one alternating current bridging amplifier coupled between said primary transmission line and a pair of said secondary transmission lines for amplifying said communications signals and isolating said secondary transmission lines; and inductive bypass means shunting each of said amplifiers for bypassing the direct current audience survey signals.

3. In a closed-curcuit distribution system for radio or television communications signals and the like wherein both communications signals and direct current audience survey signals are transmitted over the same primary and secondary transmission lines to a plurality of receivers, the combination comprising at least one alternating current transistor repeater amplifier coupled in said primary transmission line for amplifying the communications signals therein; at least one alternating current transistor bridging amplifier having a high input impedance and a low output impedance coupled between said primary transmission line and a pair of said secondary transmission lines for amplifying said communications signals and isolating said secondary transmission lines; and a coil shunting each of said amplifiers for bypassing the direct current audience survey signals.

4. In a closed-circuit distribution system for radio or television communications signals and the like wherein both communications signals and audience survey signals are transmitted over the same primary and secondary transmission lines to a plurality of receivers, the combination comprising at least one alternating current repeater amplifier coupled in said primary transmission line for amplifying the communications signals therein; at least one alternating current bridging amplifier coupled between said primary transmission line and a pair of said secondary transmission lines for amplifying said communications signals and isolating said secondary transmission lines; bypass means shunting each of said amplifiers for passing the audience survey signals; and at least one isolating network coupled between one of said secondary transmission lines and a group of said receivers for passing both communications signals and audience survey signals to said group of receivers and for isolating the receivers of said group from said secondary transmission line and from each other.

5. In a closed-circuit distribution system for radio or television communications signals and the like wherein both communications signals and direct current audience survey signals are transmitted over the same primary and secondary transmission lines to a plurality of receivers, the combination comprising at least one alternating current repeater amplifier coupled in said primary transmission line for amplifying the communications signals therein; at least one alternating current bridging amplifier having a high input impedance and a low output impedance coupled between said primary transmission line and a pair of said secondary transmission lines for amplifying said communications signals and isolating said secondary transmission lines; inductive bypass means shunting each of said amplifiers for passing the audience survey signals; and at least one isolating network coupled between one of said secondary transmission lines and a group of said receivers, said isolating network comprising an isolating resistor and a group of distribution resistors, each of said distribution resistors being coupled at one end thereof to a different receiver in said group of receivers, and at the other end thereof to one end of said isolating resistor, said isolating resistor being coupled at the other end thereof to said one secondary transmission line, whereby said isolating network passes both communications signals and audience survey signals to said group of receivers and isolates the receivers of said group from said secondary transmission line and from each other.

6. The combination claimed in claim 5, wherein said one end of each of said distribution resistors is provided with a separate ground connection for coupling said one end to the receiver associated therewith in said group of receivers.

References Cited in the file of this patent

UNITED STATES PATENTS

| | | |
|---|---|---|
| 2,092,120 | Hopkins | Sept. 7, 1937 |
| 2,143,146 | Farnsworth et al. | Jan. 10, 1939 |
| 2,470,292 | Daniel | May 17, 1949 |
| 2,539,310 | Martin | Jan. 23, 1951 |
| 2,890,296 | Ponthus et al. | June 9, 1959 |

OTHER REFERENCES

"How TV Came to Panther Valley," Radio and Television News, March 1951 (pages 31–34 and 109–110).